United States Patent [19]

West et al.

[11] 4,022,063
[45] May 10, 1977

[54] ELECTROMECHANICAL DIGITAL THERMOMETER

[75] Inventors: Roger A. West, Minneapolis, Minn.; Winston Dale Ream, Salt Lake City, Utah

[73] Assignee: RWB Labs, Hacienda Heights, Calif.

[22] Filed: Oct. 15, 1974

[21] Appl. No.: 514,442

[52] U.S. Cl. .......................... 73/362 AR; 206/306
[51] Int. Cl.$^2$ ....................................... G01K 7/22
[58] Field of Search .............. 73/362 AR; 206/306; 338/28; 340/347 AD, 347 P

[56] References Cited
UNITED STATES PATENTS

| | | | |
|---|---|---|---|
| 2,677,965 | 5/1954 | Saffir | 73/374 X |
| 2,768,736 | 10/1956 | Govoni | 206/306 |
| 3,190,436 | 6/1965 | Diamant | 206/306 |
| 3,201,575 | 8/1965 | Werner et al. | 340/347 P X |
| 3,218,628 | 11/1965 | Weinstein | 340/347 P |
| 3,248,726 | 4/1966 | Sonnenfeldt | 340/347 AD |
| 3,254,533 | 6/1966 | Tongret | 73/362 AR |
| 3,301,394 | 1/1967 | Baermann et al. | 206/306 |
| 3,441,846 | 4/1969 | Petrohilos | 73/362 AR X |
| 3,461,724 | 8/1969 | Tong et al. | 73/362 AR |
| 3,673,868 | 7/1972 | Beury et al. | 73/362 AR X |
| 3,703,892 | 11/1972 | Meyers | 206/306 X |
| 3,738,479 | 6/1973 | Sato | 206/306 |
| 3,785,207 | 1/1974 | Brzezinski | 73/362 AR |
| 3,822,593 | 7/1974 | Oudewaal | 73/362 AR X |
| 3,833,115 | 9/1974 | Schapker | 206/306 |
| 3,880,282 | 4/1975 | Naumann | 206/306 |

Primary Examiner—Jerry W. Myracle
Attorney, Agent, or Firm—Merchant, Gould, Smith, Edell, Welter & Schmidt

[57] ABSTRACT

A highly accurate low-cost electronic thermometer with digital readout, intended primarily for clinical use. Temperature sensing is accomplished by a thermistor in a probe assembly which includes a unique disposable probe cover which provides excellent thermal contact with the thermistor to a measuring circuit which includes a bridge and a rebalancing servo. Digital readout is accomplished by a coding disc driven by the servo and pickoff brushes. The coding pattern on the disc provides analog to digital conversion, compensation for the inherent nonlinearities of the thermistor, and a nonvolatile memory. Means are provided for operating the thermometer in an estimation mode to give readings more quickly than would be otherwise permitted by the thermal response of the probe. In estimation mode, measurement is terminated at a predetermined point in the measurement cycle, and a special calibration of the measurement circuit is used to give an estimate of what the final temperature would be.

9 Claims, 7 Drawing Figures

ELECTROMECHANICAL DIGITAL THERMOMETER

BACKGROUND OF THE INVENTION

In the clinical treatment of patients, the standard means of taking a patient's temperature has been through the use of a mercury-glass thermometer. In recent years, electronic temperature measuring instruments have begun to make inroads into the formerly exclusive domain of the mercury-glass thermometers. Electronic thermometers provide the potential advantages of greater accuracy, if carefully designed; greater ease and efficiency in reading, if digital readout is provided; and faster time response, as compared to a minimum of three minutes for a mercury-glass thermometer. This latter factor can result in greater patient comfort. However, electronic thermometers have not achieved universal acceptance to date, partly because of the inherent advantages in lower initial cost and greater reliability of the mercury-glass thermometers, and also partly because many of the electronic thermometers proposed to date have either failed to live up to the full theoretical advantages potentially offered by electronic devices, or else have done so only at a prohibitively high cost.

Many prior art electronic thermometers use thermistors as their sensing elements. The resistance of the thermistor changes as a function of its temperature in a manner which is predictable and repeatable, but which is unfortunately not a linear function of temperature when measured on the Fahrenheit or Centigrade scale. A wheatstone bridge circuit is often used in conjunction with a servomechanism to measure the resistance changes in the thermistor. A servoamplifier sensing imbalance in the bridge usually drives a motor which drives a variable resistance included in the bridge so as to rebalance the bridge, in response to changes caused by the changing thermistor. Some type of readout driven by the servo gives the temperature readout, through appropriate calibration. Such a readout may be a pointer moving along a dial which has the temperature calibration. Of course, such a dial-type readout is inherently an analog readout and is difficult to read in that it requires careful attention on the part of the operator to read and interpolate the scales correctly, and is additionally subject to parallax errors in viewing the needle. In an attempt to provide for the inherently superior digital readout, some prior art systems have employed an odometer type device which is geared to be run by the servo motor. Of course, such a device is still basically an analog device, and lacks the accuracy and convenience of a true digital readout, because of intermediate positions of numbers on the odometer wheels.

In an attempt to overcome some of these problems in prior art electronic thermometers, fully electronic devices have been proposed which eliminate the mechanical servo, and use all-electronic techniques to measure the variance of the thermistor. Such all-electronic devices can provide the advantages of a truly digital readout, for example, by means of seven segment numerical displays, but they suffer the disadvantages of extremely high cost. The reason for their high cost is that the electronics must not only provide for measurement of the thermistor resistance, but also analog to digital conversion of the thermistor resistance which is inherently an analog quantity, and scale calibration to give the reading in the appropriate terms. Further, if provision is to be made for reading out in either degrees Centigrade or degrees Fahrenheit, which is very desirable and becoming more so all the time, additional scaling circuitry must be provided for this purpose. Needless to say, such additional circuitry increases the cost of the all-electronic thermometers.

Another disadvantage of the all-electronic thermometers is that they do not provide for a nonvolatile memory. It would be desirable in actual clinical use to provide a nonvolatile memory so that the previous measurement would be held in the device until the next measurement is taken. The thermometer operator may wish to reconfirm the previous measurement several minutes or even hours after it was taken, for purposes of documentation. However, in all-electronic thermometers, the digital data, which may be stored in registers, is lost as soon as power it shut off. Of course, memory can be retained in an all-electronic thermometer by leaving the power on, but since for purposes of portability it is desirable that a clinical thermometer be operated on batteries, this would provide unnecessary current drain which would shorten the time between battery chargings.

Another problem to be overcome in electronic thermometers using thermistors as sensing elements is the inherent nonlinearities of the device. Some prior art devices have merely ignored the nonlinearities to result in a simple device, but one with low accuracy. This approach gives up one of the main advantages of the electronic approach. Other prior art devices have used complex electronic function generating devices intended to compensate for the nonlinearities. Such approaches add additional cost and complexity, and may require careful and frequent recalibration to maintain accuracy. Other prior art devices have used nonlinear rebalancing potentiometers in the servo mechanism, characterized so as to make up for the nonlinearities of the thermistor. However, such special potentiometers are expensive, and it is difficult to maintain close manufacturing tolerances on such devices.

Finally, there exists a need in the prior art devices for a truly satisfactory thermistor probe and cooperating sanitary disposable probe cover. Although many such devices generally exist, they have failed to fully meet the requirements of low cost, good thermal conductivity between the probe cover and the thermistor, consistent repeatability in that thermal conductivity from one probe cover to the next, and simple and sanitary one-handed operation in inserting and removing probe covers.

The present invention solves these and other problems existing in the prior art by providing an electromechanical thermometer and probe which is extremely accurate, convenient to use, provides a nonvolatile memory, fully compensates for thermistor nonlinearities, and provides these features at a cost which is much lower than fully electronic devices. Additionally, the present invention provides either Fahrenheit or Centigrade readout, at the flip of a switch, with very little increase in cost or complexity. The present invention also provides an estimation mode of operation, in which the two or so minutes required for a normal reading is reduced to only approximately fifteen seconds, while accuracy is maintained within one-tenth of a degree.

SUMMARY OF THE INVENTION

According to the present invention, there is provided a temperature measurement circuit, a coding member, means for moving the coding member according to temperature measurements made by the measurement circuit, and digital readout means responsive to the coding on the coding member and the position of the member for providing a digital readout of the measured temperature.

According to a preferred embodiment, the measurement circuit comprises a bridge circuit and a servo. A thermistor mounted in a probe for thermal contact with the patient is included in one leg of the bridge. Another member of the bridge is a variable resistor which is driven by the servo, so as to rebalance the bridge as the resistance of the thermistor changes according to temperature. A coding disc having coding data thereon is driven by the servo, so that the rotary position of the disc is indicative of the measured temperature. Brushes or other pickoff devices respond to the coding on the disc in a given position to read the coding indicative of the measured temperature. Digital decoding and readout means provide visual digital readout of the temperature.

According to another aspect of the invention, the coding on the disc is spaced therearound in a nonlinear manner, so as to fully and exactly compensate for the nonlinearity of the thermistor. Multiple coding tracks can be provided on the disc so that the temperature can be displayed directly in terms of degrees Fahrenheit or degrees Centigrade, simply by switching the readout means from one set of brushes to another. The coding on the disc can be in terms of any digital type code for operating the readouts (or for providing compatible input to a computer, etc.) with a minimum of decoding being required. The decoding disc thus inherently performs analog to digital conversion by providing at the brushes a digitized code indicative of the analog position of the disc.

Additionally, the disc provides a non-volatile memory, in that it remains in the position of the last measurement no matter how long power has been turned off. Resupplying power to the readout circuitry always redisplays the previous reading.

According to another aspect of the invention, means are provided for operating the thermometer in an estimation mode, in order that the measurement time be considerably shortened. In the estimation mode, when a measurement reaches a predetermined point in the measurement cycle, as determined by measuring the time lapse between successive indexing zones on the disc, the measurement is stopped, and the readout displays an esitmated final value for the measurement based upon the value actually reached when the measurement cycle is stopped, and also based upon a special calibration of the bridge circuit used only for estimation mode operation.

According to another aspect of the invention, a thermistor probe and cooperating probe cover are provided. A specially designed interference fit between the end of the probe containing the thermistor and the probe cover provides good thermal contact and repeatable results, very important in the estimation mode. A large flange at the end of the probe cover near the handle of the probe functions as a sanitary barrier. The interference fit and the large flange provide for single-handed insertion and removal of the probe cover.

DESCRIPTION OF THE PREFERRED EMBODIMENT

Figure 1:
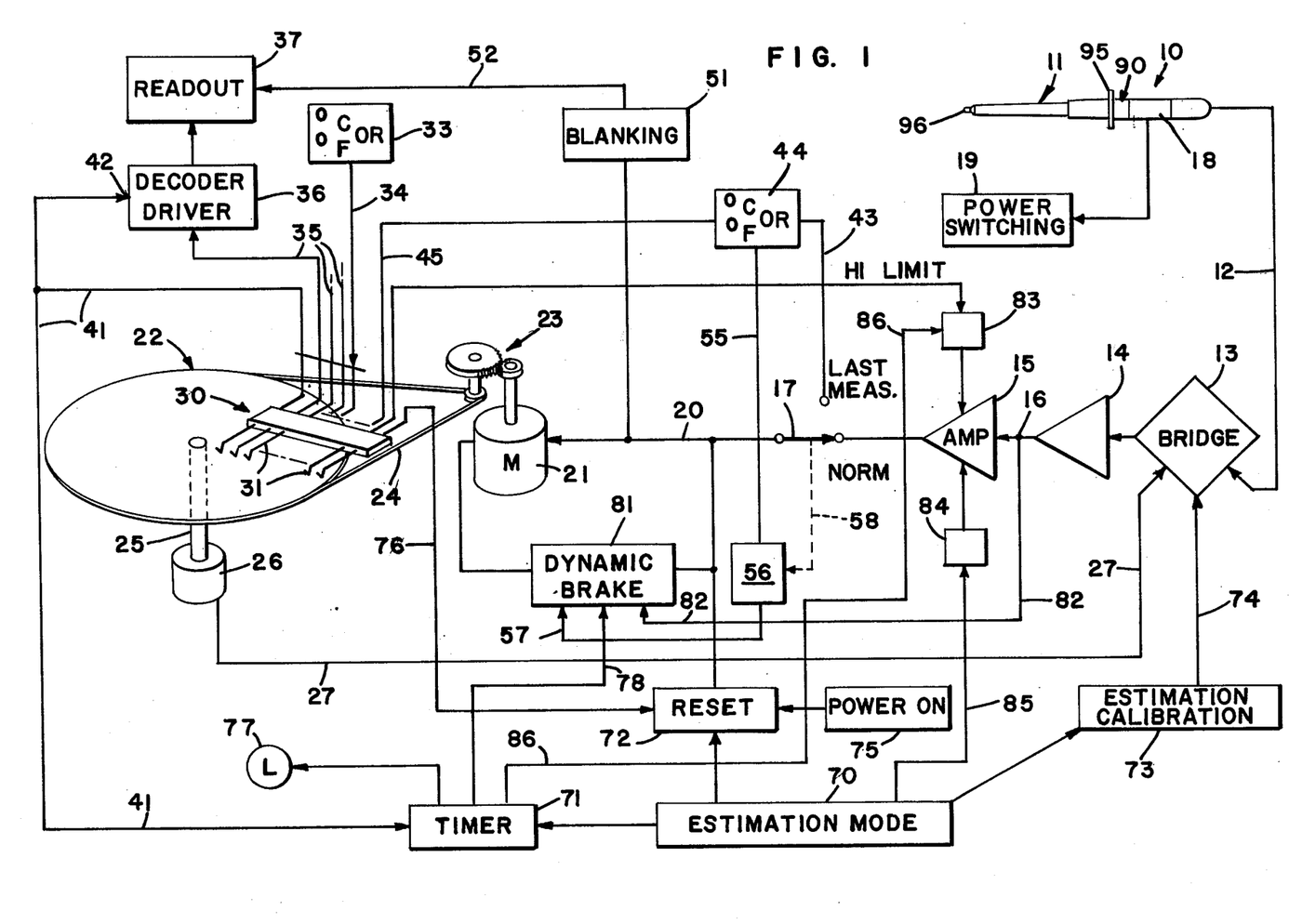
FIG. 1 is a block diagram showing the preferred embodiment of the electromechanical thermometer according to the present invention.

In FIG. 1, the preferred embodiment of an electromechanical digital thermometer is shown. Reference numeral 10 designated the temperature probe, on which is positioned the probe cover 11. The construction of these elements in the preferred embodiment forms a part of the present invention, and they are more fully described with reference to FIGS. 4 and 5. As indicated by lead 12, a thermistor, not shown, but located within probe 10, is electrically connected into the wheatstone bridge circuit 13. A servoamplifier comprising power amplifier 15 and a balanced input preamplifier 14 serves to amplify any voltage unbalance which may exist within bridge 13. The bridge 13 is connected to the input of preamplifier 14, and the output of preamplifier 14 connects by way of lead 16 to the power amplifier 15.

When switch 17 is in the normal position as indicated in FIG. 1, the output of amplifier 15 is connected by way of lead 20 to the servo motor 21. The output shaft of motor 21 drives the coding disc 22 by suitable power transmission means. As indicated diagrammatically in FIG. 1, the transmission means may comprise a gear train 23, and a drive belt 24, or both steps may be gears or belts. The coding disc 22 is pivotally mounted for rotation on a shaft 25.

A servo rebalance potentiometer 26 is connected for rotation with shaft 25. Rebalance potentiometer 26 electrically connects through lead 27 to bridge circuit 13. The rebalance potentiometer 26 can be driven by the motor, the belt or other suitable drive means; however it is preferable to mount the rebalance potentiometer directly to the shaft of the coding disc so as to prevent inaccuracies due to gear lash or slippage in the drive means. This is because the angular position of coding disc 22 and potentiometer 26 is uniquely indicative of a given temperature.

In normal operation, the basic servomechanism operates as follows. The probe 10 is placed in the patient's mouth, which causes the thermistor to change to a new resistance value. This change causes an unbalanced condition in bridge 13, which voltage unbalance is amplified by amplifiers 14 and 15 so as to drive the motor 21. The shaft 25 is thus driven to a new position until the resistance of potentiometer 26 which is fed back to bridge 13 balances the new value of the thermistor resistance. Thus, the angular position of shaft 25 and coding disc 22 is uniquely determined by, and indicative of, the temperature of the thermistor in probe 10.

In order to read out the angular position of coding disc 22, and to display it in digital form, the surface of coding disc 22 contains a number of coding tracks, each of which comprises a series of conductive and nonconductive areas. The coding configuration used in the preferred embodiment is discussed more in detail with reference to FIG. 2, below. Although any convenient coding scheme can be used, the preferred embodiment uses a binary-coded-decimal pattern.

A pickup assembly 30 has a number of individual brushes as indicated by reference numeral 31. Each brush is aligned with and normally in contact with one of the circular tracks of coding on the disc. The majority of the brushes 31 sense data in the form of the coded temperature. Other brushes perform indexing, registration, and control functions as will be explained in greater detail hereinafter. Of course, instead of conductive tracks and brushes, other means could be used to achieve the same result. For example, photodetectors and transparent/opaque tracks could be used. Also, protrusions on the disc could operate microswitches, or magnetic patterns on the disc could be read by magnetic sensors.

In a preferred embodiment, the coding disc 22 includes one data field calibrated in degrees Centigrade and another data field for degrees Fahrenheit. A suitable switching means 33 connected to appropriated brushes by means of lead 34 serve to feed the Centrigrade field or the Fahrenheit feild as may be controlled by an operator-selected switch. The data read off by the Centigrade or Fahrenheit brushes, as may be selected, is fed through a plurality of data lines indicated at 35, to decoder and driver circuits 36. These circuits generally convert the binary coded decimal data into proper form for driving seven segment digital readouts 37. In some applications (e.g. single scale) code can be taken directly to readouts without need of decoders.

A pair of brushes, one for Fahrenheit and one for Centigrade, as may be selected, provide indexing information on control line 41. This indexing information is fed to an update input 42 on decoder driver 36. The purpose of this is to eliminate any ambiguities in the readout which would result from the inevitable slight misalignment among the various data brushes. Decoder driver 36 does not change its output until it receives an update signal from input 42; and this does not happen until all of the data brushes have been switched to their next conductive or non-conductive state by the rotation of coding disc 22. The operation of the indexing feature is explained in more detail hereinafter with reference to FIG. 2.

A momentary contact switch 18 is included within the handle of probe 10, and this switch is connected to control the power switching circuit 19. Thus, when the operator of the thermometer wishes to make a reading, pressure is applied to the handle thereby activating switch 18, which in turn supplies power to the various circuits of the thermometer. When the reading is completed, the handle is released and spring-loaded switch 18 turns off the power. Thus, battery power is conserved and the unit is turned on only while the measurement is being made. Additionally, this arrangement has the advantage of allowing one-hand operation, both for turning on the circuit and holding the probe at the same time.

After a measurement has been completed, and the circuit deenergized by releasing switch 18, it may be desirable for the operator to see the last measurement again. The coding disc 22 will not have changed position since the last measurement, because the power will have been turned off, thereby disabling the servoamplifier and motor. Thus, the coding disc remains in the position corresponding to the last measurement, even though the temperature of the probe has subsequently changed, as by withdrawing the probe from the patient's mouth. The coding disc thus acts inherently as a nonvolatile memory, i.e., one whose data is not lost by disconnection of the power supply.

To recover the last measurement, a switch 17, which is preferably mounted on the front panel, is pushed to connect lead 20 with lead 43. Switch 17 is preferably a spring-loaded momentary contact switch, as it is normally left in the position indicated in FIG. 1. Lead 43 connects the motor 21 to a switching means 44 and to a control line 45 which connects to brushes in brush assembly 30 in contact with registration coding. The details of the registration coding are explained more fully with reference to FIG. 2 below. Briefly, their function is to resolve any possible ambiguities which might exist if the coding disc 22 happens to have stopped on a transistion zone in which some of the data brushes had switched to their new state and some had not. Such an ambiguity would result in a nonsense reading on readout 37. This is prevented by the registration means, which serves to connect the motor 21 to a drive voltage supplied through the registration brushes, to move disc 22 slightly, just enough to move the disc off the ambiguous zone.

Blanking circuit 51 is connected to lead 20, the input to motor 21, and is also connected to readout 37, by lead 52. Blanking circuit 51 functions as a gate to hold readouts 37 off while a measurement is being made, and turn them on when the servo is within a half of a degree of temperature or so of the final value. Blanking circuit 51 accomplishes this result by sensing voltage drive being supplied to motor 21. When this voltage drive is greater than a preset threshold amount, indicating that the servo is still being driven up to the final value, blanking circuit 51 interrupts the supply of power to readouts 37, through appropriate gating or switching devices. The blanking circuit thus serves to conserve battery power by eliminating unnecessary usage of the digital readouts which are rather power comsuming. This also contributes to the ease and efficiency of operation by eliminating false intermediate readings on the way up to the final reading, which might be confusing to the operator.

Figure 2:
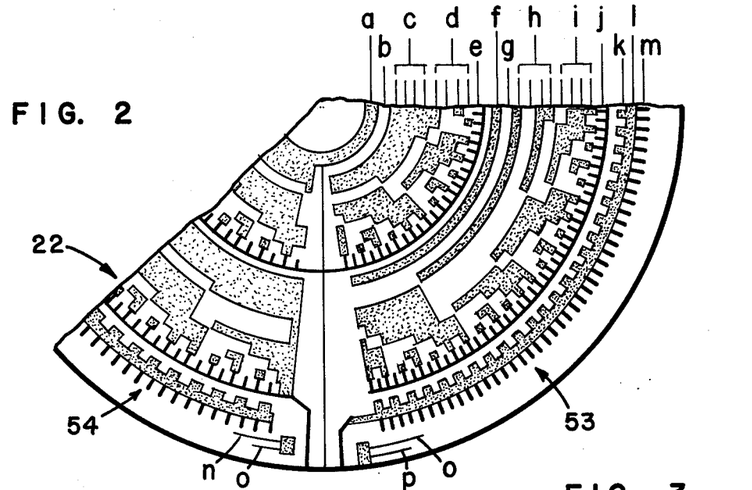
FIG. 2 shows a coding disc, part thereof being broken away, for use in the thermometer of FIG. 1.

Referring to FIG. 2, there is shown a plan for a coding disc according to the preferred embodiment, with portions thereof being broken away. In the drawing, the dark portion represents conductive tracks and the white portion represents nonconductive surface areas of the disc. The coding disc may conveniently be made by a photochemical process commonly used to make electrical printed circuits. Once the required angular position for a calibration of a given design is determined, either by calculation or by measurement, art work can be prepared and the coding disc can be made therefrom in the usual manner for printed circuits. The conductive tracks should preferably be flush with the surface of the board — there should be no step which might cause problems with the brushes.

A number of different coding schemes could be used. As previously mentioned, binary coded decimal is used in the preferred embodiment, for reasons of flexibility and economy of brushes. One alternate scheme would use the brushes to drive the respective segments of seven segment digital displays directly without the need for further electronic decoding. Since it is desirable, in a Fahrenheit scale, to provide tenths, units, tens, and a "one" in the hundreds, twenty-three brushes would be required to directly run the segments of the readouts. If readout in degrees Centigrade was also desired, another twenty or so brushes would be required for the Centigrade scales. This total number of brushes, plus those necessary for control functions, is too unweildly in practice. Of course, a double-sided coding disc could be used, with Fahrenheit on one side and Centigrade on the other, and brushes above and below, but this too would lead to further complexity. In the preferred embodiment, through the use of binary coded decimal (BCD) coding, only eighteen brushes are required to handle the full data for both Fahrenheit and Centigrade scales, with tenth degree resolution. Another ten brushes are used for various control functions.

In FIG. 2, the twenty-eight circular tracks which are traced by the brushes as the coding disc revolves, are indicated with the letters $a$ through $p$. Letters $a$ through $e$ are for the Centigrade scale, and $f$ through $j$ are for the Fahrenheit scale. Since Fahrenheit degrees represent finer degrees of temperature change than do degrees Centigrade, it is advantageous to have the Fahrenheit coding fields spaced radially further from the center, so that the spacing between segments of the tracks does not become inconveniently small.

Track $a$ is the feed track for the degrees Centigrade field. Track $b$ is the tens track, which is limited in extent to only two values because the thermometer for which the coding disc of FIG. 2 is designed is intended to handle only the range from 33.9° to 42.8° Centigrade, which corresponds to 93.0° to 109.0° Fahrenheit. The four tracks indicated with the letter $c$ represent the units digit in BCD, and the four tracks lettered $d$ represent the tenths digit in BCD. As can be readily determined from the coding pattern, the least significant bit is the furthest outward from the center of the board, within each group. Track $e$ is the index track for the degrees Centigrade.

Track $f$ is the feed track for the degrees Fahrenheit field. Track $g$ is for tens and hundreds, i.e. either ninety or one-hundred degrees Fahrenheit. The four tracks indicated with letter $h$ are for units Fahrenheit, and the four tracks marked $i$ are tenths degree Fahrenheit. Track $j$ is the index for the Fahrenheit field. Track $l$ is the feed for both tracks $k$ and $m$. K is the registration track for degrees Centigrade, and $m$ is the registration track for degrees Fahrenheit.

Track $o$ is the feed track for both the low limit track $n$, and the high limit track $p$.

The purpose of the index marks in track $j$ will now be explained. The same explanation will apply of course for the Centigrade index track $e$. Consider for a moment track $j$, and the track in group $i$ immediately adjacent track $j$. Since this track of group $i$ represents, in modified binary form, tenths of degrees Fahrenheit, it is apparent that the index track $j$ includes a conductive mark at every tenth of degree Fahrenheit. (The solid circular arc is merely part of the feed to connect all of the index marks in track $j$.) Further study shows that each of these tracks is thinner than the thickness of a conductive or nonconductive portion of the track representing tenths of degrees Fahrenheit. Assume that disc 22 is moving from one position to a new position which is one-tenth degree Fahrenheit higher (or lower). As the transition is taking place, consider what is happening to the various brushes on tracks $g$, $h$ and $i$. Some brushes will remain as they were, either on or off a conductive track. Other brushes will be transitioning either onto or off from conductive tracks. In many of the tenth degree transitions possible throughout the range of the thermometer, more than one of the brushes will be transitioning at the same time. However, because of the fact that the brushes cannot be made with absolute precision, there will inevitably be a small amount of misalignment between the brushes. This means that while one brush may have already made its transition, another may be just short of its transition. If the disc were to stop in this position, because a state of balance had been reached in the bridge, the result would be a nonsensical readout. In order to prevent this, the index marks in track $j$ are intentionally made thinner than the angular thickness of the data track with the highest resolution (tenths of degrees). Referring again to FIG. 1, the index track brush feeds into an update input 42 of the decoder driver 36. This function is in the nature of a clock pulse, which is necessary to enable the driver to increment to the next code. Thus, during the transition previously hypothesized, the previous number in the decoder will be held until all brushes have completed their transitions, and until the next mark on the index track $j$ is reached. Of course the distance between index marks is the residual quantizing error of the digital system which is about one-half of a tenth of a degree Fahrenheit.

The same principal applies with respect to track $e$, which indexes the decoder driver 36 when the degree Centigrade field is being used.

The various feed tracks, such as $a$, $f$ and $l$ are continuously engaged by their respective brushes throughout the travel of the disc. Depending upon the electrical characteristics of the decoder driver 36 and other circuits, the feed tracks can be supplied with a plus or a minus voltage, or they can simply be supplied with a ground. Those brushes in a field contacting conductive zones will then be grounded, while the other brushes will be left "floating". Whether a ground, plus or minus is used, depends upon the specific logic level requirements of the electronics employed.

The registration tracks $k$, for Centigrade, and $m$, for Fahrenheit, form a registration function which is similar to the indexing in that it is designed to prevent erroneous readings which might occur if the code wheel stopped in an ambiguous zone right on a transition point between successive tenth degree increments, with some brushes having made the transition and others not. In the normal reading mode, the ambiguity is taken care of by the indexing track, which would hold up updating the decoding circuit, so that the last true increment will be displayed even though the disc has stopped on the next transition or ambiguous zone above the last tenth degree increment. However, if power is now turned off by releasing the probe switch 18 of FIG. 1, the electronic memory function performed by the update circuitry of decoder driver 36 is now lost. If it is desired to reread the last measurement, switch 17 is pushed, which also resupplies power to the various readout circuits. With power resumed, but with the coding wheel stopped in a transition zone as previously hypothesized, a nonsensical or erroneous readout may be possible. This eventuality is prevented however by the registration means which causes the motor to drive the code wheel a short distance one way or the other to a "safe" zone, and away from a transition area.

With reference to FIG. 2, this is accomplished by feeding a voltage into track $l$ which is of plus or minus voltage, depending upon whether degrees Centigrade or degrees Fahrenheit operation is selected. A comparison of the Fahrenheit registration codes $m$ and the tenth degree Fahrenheit codes $i$ shows that the two codes are offset so that conductive areas in track $m$ overlap slightly the transition areas between adjacent tenth degree increments. The nonconductive zones of track $m$ fall well within the "safe" areas within tenth degree increments. Thus, with switch 17 connected to read the last measurement, servo motor 21 is disconnected from the amplifier, and is connected to the appropriate registration brush. If the coding disc is in an ambiguous zone, the registration brush will be contacting a conductive area in track $m$, with the result that a voltage will be supplied to motor 21 causing it to drive decoding disc 22 a short distance until the registration brush moves off the conductive area of track $m$. At this point, the data brushes will be in safe areas, and a true readout will be displayed on readout 37.

Similar action takes place with respect to registration track $k$ and the Centigrade data field, except that in the Centigrade mode, the opposite polarity is applied to feed track $l$. Thus, if disc 22 moves slightly in a clockwise direction to correct registration errors in Fahrenheit mode, it will move a slight distance in counterclockwise direction to correct registration in Centigrade mode. The reason for this is to prevent any net movement of the disc due to walking or migrating if the unit is switched back and forth between Centigrade and Fahrenheit a large number of times.

Examination of the coding pattern of disc 22 in FIG. 2 shows that the angular spacing between tenth degree increments is not uniform, but varies as a function of the distribution around the disc. For example, in the area of the disc generally indicated by reference number 53, the spacing is much closer than it is on the other end of the scale, in the area generally designated by reference number 54. This nonlinear distribution is used to compensate for the inherent nonlinearities of the thermistor device being used. The required spacing on the coding disc can be determined by calculation or experimentation for a given thermistor design.

The preferred embodiment of the present invention includes additional means for operating the thermometer in an estimation mode. The purpose of the estimation mode is to reduce the time of measurement, by making an estimate of the final temperature before the system attains final equilibrium. The estimation mode reduces the time of taking temperatures from about two minutes which is required in the normal, or tracking mode, to about fifteen seconds. When the probe is placed in a patient's mouth, the thermistor and probe cover is subjected to a sudden increase in temperature, from room temperature to body temperature. The temperature of the thermistor begins to rise, following an exponential curve whose constants are determined by the thermal conductivity and the heat capacity of the probe cover and thermistor system. The change in resistance of the thermistor also follows the exponential curve. The measurement servo also follows or tracks the exponential increase in temperature of the thermistor. Since the final approach of the system to the true or equilibrium temperature value is asymptotic, in the normal mode of operation it usually takes about two minutes to finally achieve the final value.

In the ostimation mode, the system tracks the increasing temperature of the thermistor, but only until a predetermined estimation point is reached. At this point, the system is intentionally stopped, and the number displayed is an estimate of what the final value would be if the system were allowed to continue to the final value.

Figure 3:
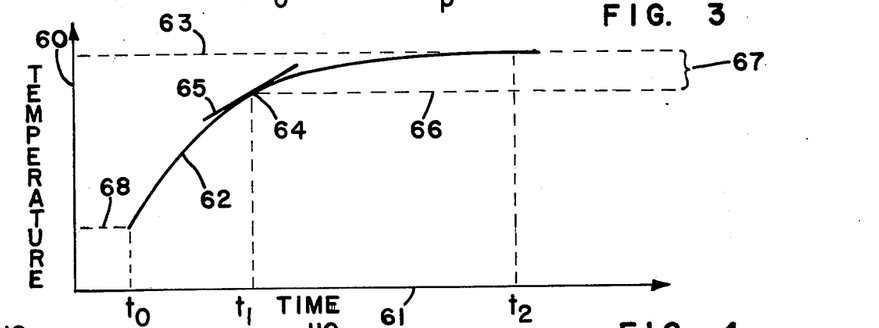
FIG. 3 is a graph illustrating the operation of the estimation mode.

In the graph of FIG. 3, 60 is the temperature axis, and 61 is the time axis. Curve 62 is the exponential increase in temperature of the thermistor, and also the response of the measurement circuit, when the probe is placed in the patient's mouth. Broken line 63 represents the temperature to be measured and represents the final value which would be reached by the thermometer at equilibrium. Broken line 68 represents the ambient temperature.

Reference numeral 64 desingates a point on the curve 62 called the estimation point. This point is defined as the point on the exponential curve having a predetermined slope, as indicated by number 65. The estimation point is the reference point for the estimation mode of operation. When the measurement circuit reaches the estimation point 64, the coding disc is stopped immediately. Broken line 66 indicates the temperature value which is actually being measured at the estimation point 64. Reference numeral 67 indicates the temperature difference between the temperature measured at the estimation point, and the final true temperature. Accordingly, the present invention uses a special calibration of the measurement circuit in estimation mode only, so as to make up the difference in temperature 67. This is accomplished by switching a predetermined bias voltage, or a predetermined calibrating resistance into bridge circuit 13 when estimation mode is used. Estimation calibration causes the disc 22 to actually move ahead of the true temperature being measured, by an amount equal to the difference 67. Thus, when the estimation point 64 is reached, the measurement circuit is disabled and the disc is stopped, and the readouts are reading the final value.

Referring again to FIG. 1, the estimation mode circuitry comprises switch or control device 70, which connects to a timer 71, a reset circuit 72, and the estimation calibration circuit 73. The estimation calibration circiuty connects by the control lead 74 to the bridge circuit, and functions when energized to alter the calibration of bridge 13, as previously described. Reset circuitry 72 connects to control line 20 which operates the motor. Reset circuitry 72 also receives a signal indicating turn on of power, as indicated by refernce numeral 75. Reset signal 72 also receives a signal via lead 76 from a brush 31 which is in contact with the low limit track $n$ on code wheel 22.

Timer 71 receives an input signal from the index pulses on control line 41. The outout of timer 71 drives an indicator light 77, and it provides an output signal on lead 78 to a dynamic braking circuit 81.

The dynamic braking circuit 81 which is connected across motor 21 operates when energized to close a relay shorting the terminals of the motor. As is well known, dynamic braking on the motor causes it to stop very quickly. The dynamic brake circuit is energized by lead 57, 78 or by lead 82. Lead 82 connects back to lead 16, between preamplifier 14 and power amplifier 15.

A pair of amplifier disabling devices 83 and 84 are associated with servoamplifier output stage 15. The devices serve to selectively disable amplifier 15 as follows. Amplifier 15 ordinarily has an output which may swing positive or negative, according to the applied input. This is necessary in the tracking mode, so that it can drive the motor one way or the other, according to changes in temperature. When disabling device 83 is energized, amplifier 15 is prevented from producing output signals of one of the two polarities. Similarly, device 84 when energized prevents amplifer 15 from producing output signals of the opposite polarity. Thus, if both devices 83 and 84 are energized, amplifier 15 is completely disabled.

By way of example, devices 83 and 84 may be switching means which serve to disconnect amplifier 15 from the respective plus and minus power supplies. Alternatively, if amplifier 15 uses complementary output transistors, devices 83 and 84 may be switches operable to clamp base to emitter of the output transistors, thereby rendering one or the other or both of the complementary output transistors inoperative.

When a measurement is to be made in estimation mode, the operator-controlled switch or control device 70 is activated and the estimation calibration circuit is switched into bridge 13. Additionally, estimation mode control 70 activates disabling device 84 through lead 85, so that the amplifier is prevented from driving the servo in a downward direction, although it is still able to drive it in an upward direction. When the probe is placed in the patient's mouth and switch 18 is activated, the measurement begins. In response to the turn on of power, reset circuitry 72 applies a large signal to motor 21, driving it very quickly down to the lowest end of its scale. When it reaches the low end of the scale, continuity is established between the limit feed track $o$ and the low limit track $n$ of FIG. 2, and a signal is transmitted only to lead 76 (FIG. 1, to reset circuitry 72, causing it to remove the reset drive from the motor. The purpose of this circuitry is to insure that estimation mode measurements always begin from a low point and move upward to the estimation point.

Referring to FIG. 3, the beginning of the measurement corresponds to time $t_o$ on curve 62. As the thermistor warms up, the measurement circuit follows the curve upward toward the estimation point, although at this time the readout disc is actually in advance of the true instantaneous temperature, because of the estimation calibration previously switched in. It will be appreciated that the coding disc 22 will move relatively fast during the initial stage of measurement on this steep portion of the measurement exponential curve. As the measurement proceeds the rate of speed of the coding disc 22 will decrease, as represented by the slope of the exponential curve 62. As coding disc 22 is rotating, pulses on index line 41 generated by the index track on the coding disc are fed to timer 71. Timer 71 is a voltage resettable monostable multivibrator. Each index pulse resets timer 71 which then again starts to time out its predetermined time interval from the beginning. While the disc is moving quickly, the timer is continually reset by succeeding index pulses, before its timing interval is allowed to run out. Eventually, the coding disc slows to the point at which the time interval between successive index pulses just exceeds the preset time interval of the timer. This is the estimation point, and at this point timer 71 completes its time and triggers disabling device 83 through lead 86, thereby removing drive from the motor 71. At the same time, the timer triggers dynamic brake 81 to immediately stop the coding disc at the estimation value. Timer 71 also energizes an indicator light 77 on the panel to inform the operator that the reading has been "completed". OF course with the removal of drive from the motor on lead 20 the blanking circuit 51 enables readouts 37 and the estimated value is displayed. If switch 18 is then released by the operator, the readout circuits will be turned off, but the reading can be recalled by activating switch 17 to display the last measurement, as previously described.

Since the spacing of the Centrigrade and Fahrenheit index marks are not equal it is preferable to use only one or the other for resetting the timer in estimation mode. Otherwise, switching means would have to be provided to change the time constant of the timer when switching from Fahrenheit to Centrigrade.

If a new measurement is to be made in estimation mode, switch 18 is reenergized, which causes reset circuitry 72 to immediately drive the coding disc to lowest position, disabling means 83 is turned off, and the measurement begins again. During estimation mode operation, since disabling means 84 prevents amplifier 15 from driving the disc in a downward direction, signals are coupled from the preamplifier at lead 16 to the dynamic brake 81 by lead 82. This is to prevent an overshoot condition. At the start of an estimation mode measurement, since the coding disc is driven fully to the low limit, during the next few seconds it may be driving very quickly upward to catch up to the warming of the thermistor already in progress. When it catches up to the proper value, if it begins to overhshoot, the build-up of voltage at lead 16 will activate the dynamic brake momentarily to stop the disc, so it can resume upward measurement at the proper slow rate.

The dynamic brake can also be used in conjunction with the registration circuitry, previously described, when switch 17 is moved to read the "last measurement". If the disc had stopped in an ambiguous zone, voltage from the degrees Centrigrade or degrees Fahrenheit registration brush would be applied through lead 43 to drive the motor. Activation of switch 17 also enables a gate device 56, as indicated by broken line 58. Voltage from the registration circuitry is applied through lead 55 to gate 56. Gate 56 connects through lead 57 to the dynamic brake 81. When the registration voltage has moved the motor and disc far enough so that the registration brush moves off the conductive track, gate 56 signals the dynamic brake to stop the motor, before it can "coast" to the next registration mark.

Figures 4, 5, 6, 7:
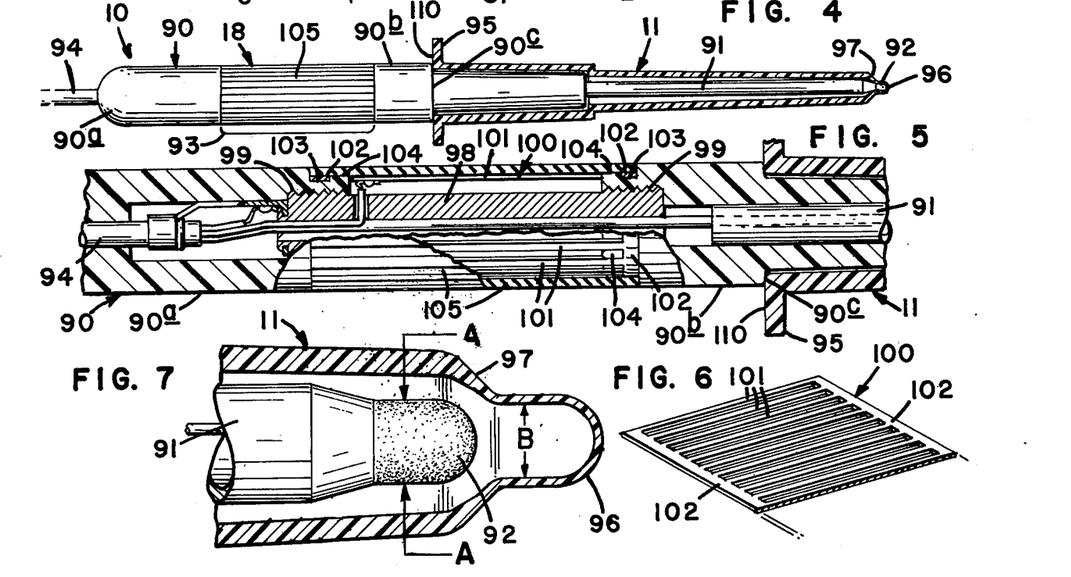
FIG. 4 is a view of the probe and cooperating probe cover of the present invention, portions thereof broken away and shown in section.
FIG. 5 is a greatly enlarged portion of the handle of the probe shown in FIG. 4, illustrating electrical switch structure incorporated therein.
FIG. 6 is a view in perspective of a component of the switch of FIG. 5, portions thereof broken away and shown in section.
FIG. 7 is an enlarged detail view of a portion of FIG. 4 illustrating a portion of the probe slightly separated from the probe cover.

Referring now to FIGS. 7–7, there is shown details of the probe assembly according to the present invention. Reference numeral 10 generally designates the probe, and reference numeral 11 refers to the cooperating probe cover. Probe 10 has a handle portion 90, and an outwardly extending tubular portion 91. The thermistor is embedded in the silver tip 92 at the end of tubular portion 91.

The handle 90 can be made by any convenient means, for example by molding from a suitable plastic material. As shown, a switch 18 is interposed between segments 90a, 90b of handle portion 90. Switch 18 comprises a relatively rigid hollow metal tube 98 which forms a first contact of switch 18. Each of the handle sections 90a, 90b is held in axial alignment with the tube 98 through screw threaded engagement of the sections 90a, 90b with the tube 98, as at 99. Switch 18 further comprises a compliant metal grid 100 having a plurality of generally parallel spaced aparts strips 101 and connecting portions 102 connecting common ends of the strips 101. Each of the sections 90a, 90b is formed with diametrically reduced annular portions 103, each of which is formed with a plurality of projections or pins 104 for a reason to become apparent hereinafter. As seen in FIG. 5, the compliant metal grid 100 is wrapped about the diametrically reduced annular portions 103 with the pins 104 receives in cooperating ones of the spaces between the strips 101 to retain the metal grid 100 in place on the annular portions 103.

A flexible sleeve 105, formed from a rubber-like material is received over the handle 90 and is sized to be positioned in embracing engagement with the compliant metal grid 100. The resilient nature of the sleeve 105 serves to hold the metal grid 100 wrapped about the annular portions 103 and engaged with the radial pins 104. As shown, opposite ends of the sleeve 105 are received in recesses formed by the reduced annular portions 103 and the wall thickness of the sleeve 105 is such that the exterior surface thereof is generally contiguous with the exterior surface of the handle sections 90a, 90b. Also, the exterior surface of the sleeve 105 is serrated or generally roughened to provide a gripping surface for a user of the probe 10.

With this arrangement of parts, a pressure actuated switched is incorporated within the handle area 90 which may be actuated by merely holding the probe handle 10 in the hand and applying pressure on a pressure zone, indicated generally by the numeral 93, with a pinching action of the forefinger and the thumb. The probe handle 10 does not require any special orientation when handled to actuate the switch 18 since pressure may be applied from any radial direction of area 93 to cause the compliant grid 100 to contact the hollow metal tube 98.

Each of the handle sections 90a, 90 b is formed with an axial passageway to provide for the passage of an electrical cable 94 carrying electrical conductors to the thermistor and to the hollow metal tube 98 and compliant metal grid 100.

The probe cover 11 is shown in FIg. 4 in cutaway view. It has a flange 95, and walls which taper or step down toward a small rounded tip portion 96.

The cooperation between the probe and the probe cover is shown is greater detail in FIG. 7. In FIG. 7, the end of tubular portion 91 of the probe is shown bonded to a silver tip 92, in which is embedded the thermistor. The silver is used to provide good thermal conductivity, and to provide the shape required to cooperate with the probe cover. The wall of probe cover 11 tapers down as at 97 to the rounded tip portion 96. The thickness of the probe cover in the tipe zone 96 is approximately 0.012 inches in the preferred embodiment. The thickness of the walls of the probe cover are greater elsewhere along the probe, to provide mechanical rigidity as required.

The probe cover is held onto the probe, and at the same time is held in good thermal contact to the probe by means of an interference fit. The inside dimension B of the probe cover tip 96 is slightly smaller than the outside dimension A of the tip 92. In the preferred embodiment, dimension A is approximately 0.082 inch, while dimension B is approximately 0.081 inch. Thus, there is the difference of approximately 1/1000th of an inch, which provides the interference fit.

There are two reasons for having the interference fit. The first reason is to provide good thermal contact through the probe cover to the tip 92. When the silver tip 92 of the probe is thrust into the tip 96 of the cover, the cover is forced to expand within its elastic limit, so as to provide intimate contact between the probe and probe cover.

Secondly, the interference fit of the probe cover on the probe provides the force that holds the cover in place. In practice, a supply of probe covers can be packaged in a sanitary container, tips down. The probe can be thrust into the open flange end of a cover in the container so that the silver tip is forced into the probe cover tip. The probe can then be withdrawn, pulling the cover with it. It will be noted that except for the interference fit aforementioned, the internal diametric dimensions of the probe cover 11 are slightly larger than the corresponding exterior diametric dimensions of the adjacent portions of the probe 10. Thus, no drag occurs as one attempts to Insert the tubular portion into the probe cover except that occurring when the tip 92 makes the interference fit with the tip portion 96. However, if this interference fit is not made, the loose relationship of the remainder of the probe cover 11 and probe 10 allows for easy disengagement or withdrawal of the probe 10 from the probe cover 11 to warn the user of improper assembly and possibly a wrong readout of a patient's temperature. The axial dimension of the probe cover 11 is such that the flange 95 engages a shoulder 90c formed on the handle 90 as the tip 92 is fully received within the tip portion 96. This prevents accidental damage to the relatively thin walls of the tip portion 96 and possible contamination of the probe 10. After use, a simple flick or push of the thumb by the operator will remove the probe cover, so that it can drop into a disposal container. It will thus be appreciated that, in addition to providing good thermal contact, the probe and cooperating probe cover of the present invention provide for simple, single-hand insertion and removal of the cover. Additionally, since the probe handle contains the activation switch for the thermometer, as previously explained, the entire operation of the device can be accomplished with one hand.

The flange 95 likewise serves a number of purposes. For one thing, it serves as a barrier so as to keep saliva from contaiminating the handle of the probe, since the probe will be used on many patients. The flange also serves as a barrier to keep the operator's fingers and thumb on the handle, and not out on the probe cover. Finally, the flange serves as a convenient means for removing the probe cover by a flick of the thumb, as previously explained. The thumb expels the probe cover 11 by pushing the "shadowed" or protected side 110 of the flange 95 so as to not contaminate the user from contaminants deposited on the remainder of the probe cover 11.

The probe cover 11 is preferably made of high density polyethylene, and could be made in a number of ways The thin end portion of the probe cover which makes the interference fit with the probe could be formed as a single piece, then bonded to the thicker remaining portion of the probe cover. The thin portion could be made for example by repeated dipping of a properly dimensioned core into a plastic melt, to build up the desired thickness. Although it would be possible to machine the entire probe cover down to the required dimensions, as yet another way of forming it, in practice the most economical way of making the probe cover is by injection molding. For example, in the presently preferred embodiment, probe covers are made by an injection molding process as disclosed in the John R. Naumann patent, U.S. Pat No. 3,880,282, filed Jan. 12. 1973, issued Apr. 29, 1975.

In summary, the present invention provides a highly accurate and low cost electromechanical theremometer with digital readout, and an improved probe and cooperating probe cover for use therewith.

What is claimed is:

1. A probe assembly for a thermometer, comprising:
   a. a generally tubular elongated probe, said probe having a temperature sensing element near one end thereof; and
   b. a generally tubular probe cover adapted to fit over said one end of the probe, said cover having a tip whose normal inside dimension is slightly smaller than the corresponding outside dimension of the temperature sensing end of the probe, so as to provide an interference fit to hold the probe cover on, the internal cross sectional dimensions of the cover, except for the tip, being generally larger than the corresponding exterior cross sectional dimensions of adjacent portions of said probe.

2. A temperature sensing probe assembly for a thermometer, comprising:
   a. a handle;
   b. an elongated portion extending from said handle;
   c. a temperature sensitive element, said temperature sensitive element embedded in a rounded metallic tip attached to the end of the elongated portion;
   d. a generally tapered tubular plastic probe cover adapted to fit over the elongated portion, said cover having a flange around one end and tapering at its other end to a tip of rounded configuration for conforming with the metallic tip; and
   e. the inside diameter of the cover tip being slightly less than the outside diameter of the metallic tip to provide an interference fit of the probe cover on the probe, the internal cross sectional dimensions of said cover being generally larger than the corresponding exterior cross sectional dimensions of adjacent portions of said elongated portion, except at said tip, whereby said interference fit provides the only force holding said probe cover on the probe.

3. Apparatus according to claim 2 wherein said probe cover is made of high density polyethylene.

4. The temperature sensing probe assembly of claim 2 wherein said handle has a shoulder thereon, and wherein said flange abuts said shoulder when said metallic tip is fully received within said cover tip.

5. A probe cover for a generally elongated probe which has a temperature sensing element near one end thereof, said probe cover comprising a generally tubular member adapted to fit over one end of the probe, said cover having a tip whose normal inside dimension is slightly smaller than the corresponding outside dimensions of the temperature sensing end of the probe, so as to provide an interference fit to hold the probe cover on, the internal cross sectional dimensions of said cover, except for the tip, being generally larger than the corresponding exterior cross sectional dimensions of adjacent portions of said probe.

6. A probe cover for a temperature sensing probe which includes a handle, an elongated portion extending from the handle, and a temperature sensitive element embedded in a rounded metallic tip attached to the end of the elongated portion, said probe cover comprising:
   a. a generally tapered tubular plastic member adapted to fit over the elongated portion of the probe, said member tapering at one end to a tip of rounded configuraton for conforming with the shape of the metallic tip of the probe; and
   b. the inside diameter of the probe cover tip being slightly less than the outside diameter of the metallic tip, to provide an interference fit of the probe cover on the probe, the internal cross sectional dimensions of said cover being generally larger than the corresponding exterior cross sectional dimensions of adjacent portions of said elongated portion, except at said tip, whereby said interference fit provides the only force holding said probe cover on the probe.

7. A probe cover according to claim 6 wherein said tubular plastic member further includes a flange around its other end opposite the tip, so as to provide a sanitary barrier and convenient means for removing the probe cover from the probe.

8. A probe cover according to claim 6 wherein said tubular plastic member is made of high density polyethylene.

9. A semi-rigid, generally tubular probe cover for an elongated probe including a handle portion with a shoulder thereon, an elongated portion extending from the handle, and a temperature sensitive element embedded in a rounded metallic tip attached to the end of the elongated portion, said probe cover comprising:
   a. a generally tubular member adapted to fit over the elongated portion of the probe;
   b. said member having a tip end with an inside diameter which is slightly less than the outside diameter of the metallic tip to provide an interference fit of the probe cover with the probe;
   c. said member having an open end at a predetermined distance from said tip end, with a flange therearound, said predetermined distance being such that when the metallic tip is fully received within said tip end, said flange abuts the shoulder on the probe handle; and
   d. said member having interior cross sectional dimensions which are larger than corresponding exterior dimensions of the probe, except at the tip and flanged end, so that the only points of contact between the probe and the mounted probe cover are at said points of abutment and interference fit, whereby the interference fit supplies the only force holding the probe cover on the probe.

* * * * *

UNITED STATES PATENT AND TRADEMARK OFFICE
CERTIFICATE OF CORRECTION

PATENT NO. : 4,022,063
DATED : May 10, 1977
INVENTOR(S) : Roger A. West and Winston Dale Ream It is certified that error appears in the above-identified patent and that said Letters Patent are hereby corrected as shown below:

Column 1, line 11, the word "thermometers" should be changed to the word --thermometer--.

Column 5, line 33, the word "appropriated" should be changed to the word --appropriate--.

Column 5, line 35, the word "feild" should be changed to the word --field--.

Column 6, line 52, the word "comsuming" should be changed to the word --consuming--.

Column 10, line 7, the word "ostimation" should be changed to the word --estimation--.

Column 10, line 23, the word "desingates" should be changed to the word --designates--.

Column 10, line 51, the word "circiutry" should be changed to the word --circuitry--.

Column 10, line 57, the word "fernce" should be changed to --ference--.

UNITED STATES PATENT AND TRADEMARK OFFICE
CERTIFICATE OF CORRECTION

PATENT NO. : 4,022,063
DATED : May 10, 1977
INVENTOR(S) : Roger A. West and Winston Dale Ream It is certified that error appears in the above-identified patent and that said Letters Patent are hereby corrected as shown below:

Column 11, line 5, the word "The" should be changed to the word --These--.

Column 12, line 9, the word "OF" should be changed to --Of--.

Column 12, line 36, the prefix "overh-" should be changed to --over---.

Column 12, line 57, the numbers "7-7" should be changed to --4-7--.

Column 13, line 7, the word "aparts" should be changed to --apart--.

Column 13, line 15, the word "receives" should be changed to --received--.

Column 13, line 33, the word "switched" should be changed to --switch--.

Column 13, line 48, the abbreviation "FIg." should be changed to --FIG.--

UNITED STATES PATENT AND TRADEMARK OFFICE
CERTIFICATE OF CORRECTION

PATENT NO. : 4,022,063
DATED : May 10, 1977
INVENTOR(S) : Roger A. West and Winston Dale Ream It is certified that error appears in the above-identified patent and that said Letters Patent are hereby corrected as shown below:

Column 14, line 24, the word "Insert" should be changed to --insert--.

Column 14, line 50, the word "contaiminating" should be changed to --contaminating--.

Column 14, line 63, the words "ways The" should be changed to --ways. The--.

Column 15, line 62 and Column 16, line 1, the word "dimensions" should be changed to --dimension--.

Column 16, line 16, the word "configuraton" should be changed to --configuration--.

Signed and Sealed this

Thirteenth Day of September 1977

[SEAL]

Attest:

RUTH C. MASON
Attesting Officer

LUTRELLE F. PARKER
Acting Commissioner of Patents and Trademark